(12) United States Patent
Kallio et al.

(10) Patent No.: US 7,018,710 B2
(45) Date of Patent: Mar. 28, 2006

(54) HEAT SEALABLE POLYETHYLENE FILM AND METHOD FOR ITS PREPARATION

(75) Inventors: Kalle Kallio, Porvoo (FI); Jari Äärilä, Porvoo (FI); Merete Skar, Stathelle (NO); Arja Lehtinen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 357 days.

(21) Appl. No.: 10/312,713

(22) PCT Filed: Jun. 29, 2001

(86) PCT No.: PCT/GB01/02924

§ 371 (c)(1),
(2), (4) Date: May 7, 2003

(87) PCT Pub. No.: WO02/02323

PCT Pub. Date: Jan. 10, 2002

(65) Prior Publication Data

US 2003/0171501 A1 Sep. 11, 2003

(30) Foreign Application Priority Data

Jun. 30, 2000 (GB) .............................. 0016153

(51) Int. Cl.
*B32B 27/08* (2006.01)
*B32B 27/32* (2006.01)

(52) U.S. Cl. ................ 428/347; 428/500; 428/355 EN; 428/516; 428/523; 525/240; 526/348.1; 264/464; 264/176.1

(58) Field of Classification Search ................ 428/347, 428/500, 355 EN, 516, 523; 525/240; 526/348.1; 264/464, 176.1
See application file for complete search history.

(56) References Cited

U.S. PATENT DOCUMENTS

| | | | |
|---|---|---|---|
| 5,741,861 A | 4/1998 | Yamamoto et al. | |
| 5,792,534 A | 8/1998 | deGroot | |
| 5,874,139 A | * 2/1999 | Bosiers et al. | 428/35.2 |
| 6,469,103 B1 | * 10/2002 | Jain et al. | 525/240 |

FOREIGN PATENT DOCUMENTS

| | | |
|---|---|---|
| EP | 0605952 A3 | 7/1994 |
| EP | 0721967 A1 | 7/1996 |
| WO | 93/03093 | 2/1993 |
| WO | 98/30628 A | 7/1998 |

* cited by examiner

*Primary Examiner*—Roberto Rabago
(74) *Attorney, Agent, or Firm*—Nixon & Vanderhye P.C.

(57) ABSTRACT

A process for the preparation of a heat sealable film comprising a core layer and a sealing layer, said process comprising attaching said core layer to said sealing layer, said sealing layer comprising an ethylene copolymer composition in which: (1) there are two distinct maxima in the TREF fractogram of the ethylene copolymer composition; (2) at lest 10%, of the ethylene copolymer composition elutes in TREF at a temperature of less than 50° C.; (3) at least 25%, of the ethylene copolymer composition elutes in TREF at a temperature of higher than 75° C.; (4) none of the ethylene copolymer composition elutes in TREF at a temperature of higher than 100° C.; (5) the ethylene copolymer composition comprises two components, one of which is of relatively high comonomer content and high molecular weight, the other of which is of relatively low comonomer content and low molecular weight, both components being prepared by polymerisation of ethylene with a $C_{3-20}$ alpha-olefin in the present of a single site catalyst; (6) the ethylene copolymer composition has a density of between 905 and 930 kg/m$^3$, and an $MFR_2$ between 0.3 and 4.0 g/10 min.

16 Claims, 4 Drawing Sheets

HEAT SEALABLE POLYETHYLENE FILM AND METHOD FOR ITS PREPARATION

The present application is a U.S. National Phase (371 application) of PCT/GB01/02924.

The present invention relates to a process for the production of heat sealable film and to the heat sealable film per se. In particular, the invention relates to the use of a particular polyolefin composition in the manufacture of the sealing layer in such heat sealable films.

Heat sealable films are used in industry for a wide variety of applications such as food and medical packaging. The use of a variety of polyolefins to produce films with good optical properties, high impact strength and good processability is well-known in the art. Polymers or blends of polymers used to make the films are selected for use because they provide excellent transparency, excellent processability and/or a strong seal between the film and article to be sealed. Such seals are preferably rapidly and readily formed by a single short application of heat and/or pressure.

The entire heat sealed film may be constructed from the same polymer or a blend of polymers. More often, the films are constructed using layers of different materials and polymers. This type of construction is employed to ensure that multilayer films have desirable physical and mechanical properties such as clarity, strength, and resistance to puncture and tearing, in addition to heat sealing properties. Such multilayer films should be easily processed by high speed equipment.

Many plastic materials are known to possess good physical and mechanical properties but often do not also possess good heat sealing properties. For example, polypropylene has good strength and clarity and is resistant to tearing, but does not readily form good seals at the temperatures which are preferred in commercial sealing machinery. Conversely, some polymers with good heat sealing properties do not have adequate strength or clarity.

The packaging art has therefore developed multiple layer films incorporating one or more layers of the same or different types of polymers that provide good mechanical and physical properties and providing one or more additional layers formed from polymers that provide the film with good heat sealing properties. In this way, a film may be produced having a substrate layer of polypropylene provided for strength and clarity and a layer of polyethylene to provide good heat sealing properties.

Various types of polyethylene polymers are known in the art as having acceptable heat sealing properties, e.g. low density polyethylene (LDPE), linear low density polyethylene (LLDPE), ultra linear low density polyethylene (ULLDPE), metallocene based LLDPE (mLLDPE), ethylene-vinyl acetate (EVA), ethylene butyl acrylate (EBA), ethylene methyl acrylate (EMA) and high density polyethylene (HDPE). These polymers often form part of the sealing layer often as blends with other polymers within this group. In most cases, the seal which is formed between the film and article to be sealed is put under load while it is still warm. This means that the hot-tack properties of the sealing layer are crucial to ensure a strong seal is formed even before cooling.

EP-A-605952 discloses a polymer composition comprising two different ethylene copolymers obtained using dual-site metallocene catalysts. These two polymers are combined by, for example, blending to form a composition suitable in the preparation of films. However, the examples indicate that ethylene copolymer components produced using a single site catalyst give rise to films with inferior optical and mechanical properties as well as poor processability.

WO 93/03093 discloses films comprising two layers, one of which may be formed by a blend of ethylene interpolymers. The ethylene interpolymers of use in the films are ill-defined but these should in general have narrow molecular weight distributions or comonomer distributions.

All heat sealable films have a window within which sealing may occur, i.e. in which the sealing layer becomes partially molten. Traditionally, this sealing window has been rather narrow meaning that temperature control during the heat sealing process is critical. It would be advantageous if sealing layers with broader sealing windows could be developed since this would allow the sealing operation to take place at lower temperature and also ensure that temperature control during heat sealing is less important.

By operating at lower temperature there are the benefits that the article to be sealed is not exposed to high temperature and the other layers of the film which may not be involved in sealing are also not exposed to high temperature. There are also economic advantages since lower temperatures are of course cheaper to generate and maintain.

Whilst the above polyethylene polymers give rise to high strength seals, the sealing windows of these polymers are very narrow. There still remains a desire to produce films with broader and lower sealing windows and high sealing strength.

There also remains a need to produce such films with high hot-tack values and preferably these films can be prepared by coextrusion as opposed to lamination or the like since coextrusion is a much more efficient method of film production.

It has now been found that by preparing a film comprising a core layer and a sealing layer, wherein the sealing layer comprises a particular bimodal ethylene copolymer composition, films with especially broad heat sealing windows may be prepared. These films have applications in many areas of industry, particularly in medical and food packaging.

Thus, viewed from one aspect the invention provides a process for the preparation of a heat sealable film comprising a core layer and a sealing layer, said process comprising attaching said core layer to said sealing layer, said sealing layer comprising an ethylene copolymer composition in which (1) there are two distinct maxima in the TREF fractogram of the ethylene copolymer composition;
(2) at least 10%, preferably at least 15%, in particular at least 20% of the ethylene copolymer composition elutes in TREF at a temperature of less than 50° C.;
(3) at least 25%, preferably at least 30% of the ethylene copolymer composition elutes in TREF at a temperature of higher than 75° C.;
(4) none of the ethylene copolymer composition elutes in TREF at a temperature of higher than 100° C.;
(5) the ethylene copolymer composition comprises two components, one of which is of relatively high comonomer content and high molecular weight, the other of which is of relatively low comonomer content and low molecular weight, both components being prepared by polymerisation of ethylene with a $C_{3-20}$ alpha-olefin in the present of a single site catalyst;
(6) the ethylene copolymer composition has a density of between 905 and 930 kg/m$^3$, preferably between 905 and 920 kg/m$^3$ and an MFR$_2$ between 0.3 and 4.0 g/10 min.

Viewed from another aspect the invention provides a heat sealable film obtainable by a process as hereinbefore described.

Viewed from yet another aspect the invention provides the use of a film obtainable by a process as hereinbefore described in packaging.

The film of the invention may comprise additional layers over and above the sealing layer and core layer. In this case, the additional layers must be positioned on the opposite side of the core layer from the sealing layer thus ensuring that the sealing layer remains outermost on the film.

The sealing layer comprises a mixture of two ethylene copolymers, one having a relatively low molecular weight and content of comonomer and one having a relatively high molecular weight and content of comonomer. Thus, the ethylene copolymer composition of use in the sealing layer is bimodal both in terms of density and molecular weight. The differences in comonomer distribution between the high and low molecular weight components must be such that two maxima are observed on the TREF fractogram of the ethylene copolymer composition.

TREF fractograms are obtained by the method described in the Journal of Polymer Science: Polymer Physics edition, Vol 20, 441–455 (1982) Wild et al. The method is based on the different solubilities of the polymer fractions having different comonomer contents in a specific solvent at different temperatures. In the present invention, TREF fractograms are taken using xylene for crystallisation and 1,2,4-trichlorobenzene as the solvent. The presence of two maxima in the TREF fractogram indicates broad comonomer distribution.

Whilst it is possible to blend the ethylene copolymer composition of the sealing layer with other polymers such as linear low density polyethylene, low density polyethylene or polar ethylene copolymers such as EVA this is not a preferred embodiment.

In the ethylene copolymer composition of the sealing layer, there should be no elution in the TREF fractogram above 100° C. This ensures that the ethylene copolymer composition is free from high density polymer fractions ensuring excellent homogeneity and optical properties.

The fact that at least 10% of the ethylene copolymer composition elutes at less than 50° C. and at least 25% of the ethylene copolymer composition elutes at more than 75° C. ensures that the ethylene copolymer composition comprises a broad comonomer distribution.

The low molecular weight component (B) preferably has a weight average molecular weight of 5,000 to 50,000 g/mol, preferably 10,000 to 30,000 g/mol. The $MFR_2$ of the low molecular weight component (B) is preferably 50 to 1,000 g/10 min, more preferably 50 to 300 g/10 min and especially 75 to 200 g/10 min. The density of this low molecular weight component is preferably 925 to 945 kg/m$^3$, more preferably 925 to 940 kg/m$^3$, and especially 927 to 937 kg/m$^3$. The Mn/Mw of the low molecular weight component is typically between 2.0 and 4.0, preferably between 2.5 and 4.0.

Component (B) is a copolymer of ethylene and at least one $C_{3-20}$ alpha olefin comonomer. Suitable comonomers include propene, 1-butene, 1-hexene or 1-octene. Preferably, there is only one comonomer present in the low molecular weight component.

The content of comonomer in the component (B) is preferably 1.0 to 3.5%/mol, preferably 1.5 to 3.5%/mol. Whilst the overall comonomer distribution of the ethylene copolymer composition is broad, it is possible for the comonomer distributions of the low and high molecular weight components to be relatively narrow as long as these components have different average comonomer contents.

The high molecular weight component (C) may have a weight average molecular weight of 50,000 to 500,000 g/mol, preferably 100,000 to 300,000 g/mol and a density of 860 to 910 kg/m$^3$, preferably 890 to 910 kg/m$^3$. The Mn/Mw of the high molecular weight component is typically between 2.5 and 5.0, preferably 3.0 to 4.5.

Comonomers employed in the manufacture of component (C) are identical to those in the manufacture of component (B) although the content of comonomer in component (C) should be higher. The comonomer content in the component (C) is preferably 5 to 8%/mol, preferably 6 to 8%/mol. Whilst the comonomers employed in components (B) and (C) may be different, it is preferred if they are the same.

When components (B) and (C) are combined the resulting ethylene copolymer composition (A) may have a weight average molecular weight of 50,000 to 200,000 g/mol, an $MFR_2$ of 0.3 to 5.0 g/10 min, preferably 0.5 to 3.0 g/10 min and a density of 905 to 930 kg/m$^3$, preferably 905 to 920 kg/m$^3$.

The weight ratio of components (B) and (C) in the composition (A) is between 30/70 to 60/40, preferably 35/65 to 45/55 and in particular 38/62 to 43/57.

The components (B) and (C) are prepared using a single site catalyst, i.e. a catalyst comprising a metallocene procatalyst species. Suitable metallocenes are well-known to the skilled person and include optionally substituted cyclopentadienyl, indenyl or fluorenyl metallocenes with Group III to VI metals. In particular the η-ligand may be substituted by an alkyl or siloxy group as is known in the art. Particularly preferred metallocenes are disclosed in FI-A-9349167 and are based on a complex of formula $X_2HfCp_2$ wherein each X is independently halogen, methyl, benzyl, amido or hydrogen; each Cp is independently a cyclopentadienyl substituted by a $C_{1-10}$ linear or branched hydrocarbyl group. Especially preferably the metallocene is a bis(n-butylcyclopentadienyl) hafnium dihalide.

Alternatively, the metallocene may be as described in FI-A-960437, i.e. a siloxy-substituted bridged bisindenyl zirconium dihalide.

Metallocene procatalysts are preferably used in combination with a cocatalyst. Suitable cocatalysts include aluminium alkyl compounds. While the aluminium alkyl compound may be an aluminium trialkyl (e.g. triethylaluminium (TEA)) or an aluminium dialkyl halide (e.g. diethyl aluminium chloride (DEAC)), it is preferably an alumoxane, particularly MAO, isobutylalumoxane, eg TIBAO (tetraisobutylalumoxane) or HIBAO (hexaisobutylalumoxane). Alternatively the metallocene procatalysts may be used with other cocatalysts, eg boron compounds such as $B(C_6F_5)_3$, $C_6H_5N(CH_3)_2H:B(C_6F_5)_4$, $(C_6H_5)_3C:B(C_6F_5)_4$ or $Ni(CN)_4[B(C_6F_5)_3]_4^{2-}$. Again, the use of cocatalysts is known in the art.

The metallocene procatalyst and cocatalyst may be introduced into the polymerization reactor separately or together or, more preferably they are pre-reacted and their reaction product is introduced into the polymerization reactor.

If desired, the procatalyst, procatalyst/cocatalyst mixture or a procatalyst/cocatalyst reaction product may be used in unsupported form or it may be precipitated and used as such. However the metallocene procatalyst or its reaction product with the cocatalyst is preferably introduced into the polymerization reactor in supported form, eg impregnated into a porous particulate support.

The particulate support material used is preferably an inorganic material, especially preferably a metal or pseudo metal oxide such as silica, alumina or zirconia or a mixed oxide such as silica-alumina, in particular silica, alumina or silica-alumina. Such supports are well known in the art.

Especially preferably the support is a porous material so that the metallocene may be loaded into the pores of the support, e.g. using a process analogous to those described in WO94/14856 (Mobil), WO95/12622 (Borealis) and WO96/00243 (Exxon). The particle size is not critical but is preferably in the range 5 to 200 μm, more preferably 20 to 80 μm.

Before loading, the particulate support material is preferably calcined, ie heat treated, preferably under a non-reactive gas such as nitrogen. This treatment is preferably at a temperature in excess of 100° C., more preferably 200° C. or higher, e.g. 200–800° C., particularly about 300° C. The calcination treatment is preferably effected for several hours, e.g. 2 to 30 hours, more preferably about 10 hours.

The support may be treated with an alkylating agent before being loaded with the metallocene. Treatment with the alkylating agent may be effected using an alkylating agent in a gas or liquid phase, e.g. in an organic solvent for the alkylating agent. The alkylating agent may be any agent capable of introducing alkyl groups, preferably $C_{1-6}$ alkyl groups and most especially preferably methyl groups. Such agents are well known in the field of synthetic organic chemistry. Preferably the alkylating agent is an organometallic compound, especially an organoaluminium compound (such as trimethylaluminium (TMA), dimethyl aluminium chloride, triethylaluminium) or a compound such as methyl lithium, dimethyl magnesium, triethylboron, etc.

The quantity of alkylating agent used will depend upon the number of active sites on the surface of the carrier. Thus for example, for a silica support, surface hydroxyls are capable of reacting with the alkylating agent. In general, an excess of alkylating agent is preferably used with any unreacted alkylating agent subsequently being washed away.

The optionally alkylated support material is loaded with the procatalyst, preferably using a solution of the procatalyst in an organic solvent therefor, e.g. as described in the patent publications referred to above. Preferably, the volume of procatalyst solution used is from 50 to 500% of the pore volume of the carrier, more especially preferably 80 to 120%. The concentration of procatalyst compound in the solution used can vary from dilute to saturated depending on the amount of metallocene active sites that it is desired be loaded into the carrier pores.

The active metal (ie. the metal of the procatalyst) is preferably loaded onto the support material at from 0.1 to 4%, preferably 0.5 to 3.0%, especially 1.0 to 2.0%, by weight metal relative to the dry weight of the support material.

After loading of the procatalyst onto the support material, the loaded support may be recovered for use in olefin polymerization, e.g. by separation of any excess procatalyst solution and if desired drying of the loaded support, optionally at elevated temperatures, e.g. 25 to 80° C.

Alternatively, a cocatalyst, e.g. an alumoxane or an ionic catalyst activator (such as a boron or aluminium compound, especially a fluoroborate) may also be mixed with or loaded onto the catalyst support material. This may be done subsequently or more preferably simultaneously to loading of the procatalyst, for example by including the cocatalyst in the solution of the procatalyst or, by contacting the procatalyst loaded support material with a solution of the cocatalyst or catalyst activator, e.g. a solution in an organic solvent. Alternatively however any such further material may be added to the procatalyst loaded support material in the polymerization reactor or shortly before dosing of the catalyst material into the reactor.

Where the further material is loaded onto the procatalyst loaded support material, the support may be recovered and if desired dried before use in olefin polymerization.

Components B and C may be prepared by conventional polymerisation processes, e.g. in slurry, gas or solution phase. The low molecular weight component (B) is preferably produced in a slurry phase process employing for example a light hydrocarbon diluent such as propane or isobutane.

For slurry reactors, the reaction temperature will generally be in the range 60 to 110° C. (e.g. 65–75° C.), the reactor pressure will generally be in the range 5 to 80 bar (e.g. 35–85 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions.

The high molecular weight component (C) is preferably produced in a gas phase process. For gas phase reactors, the reaction temperature used will generally be in the range 60 to 115° C. (e.g. 65 to 85° C.), the reactor pressure will generally be in the range 10 to 25 bar, and the residence time will generally be 1 to 8 hours. The gas used will commonly be a non-reactive gas such as nitrogen together with monomer (e.g. ethylene).

Components (B) and (C) may be blended using standard procedures although it is preferred if components B and C are produced in a cascaded process of two or more reactors operating at different conditions. In this way a more homogeneous polymer powder may be produced. Thus, in one embodiment the reactors may be of the same type, e.g. two slurry phase reactors in series or two gas phase reactors. Preferably however, the reactors are of different types and especially preferably the components (B) and (C) are produced by a slurry phase (e.g. loop reactor) and gas phase reactor in series. Such a set up is described in EP-A-517868 which is hereby incorporated by reference.

Using a cascaded slurry and gas phase reactor system, the low molecular weight component may be produced in the slurry reactor and the high molecular weight component produced in the gas phase reactor.

Hydrogen may be introduced into a reactor to control the molecular weight of the polymer as is well-known and routine in the art.

The concentration of hydrogen should be such that the low molecular weight component (B) has the desired specified MFR. Due to high conversion rates of hydrogen, the required concentration of hydrogen in the reactor which produces the low molecular weight component is low. Thus, when the ratio of hydrogen to ethylene is between 0.4 and 1 mol hydrogen per 1 kmol of ethylene, a polymer having the desired MPR for the low molecular weight component is obtained.

In order to produce the high molecular weight component it is also possible to use hydrogen in, for example, the gas phase reactor although it is preferred if no additional hydrogen is added over and above that used in the reactor which produces the low molecular weight component. If additional hydrogen is used, this should be at very low concentration e.g. the ratio of hydrogen to ethylene should be lower than 0.4 mol/kmol, preferably less than 0.3 mol/kmol and in particular less than 0.2 mol/kmol. Clearly, the concentration of hydrogen is such that components with the desired molecular weights are produced.

Comonomer is introduced into the reactors to control the density of the components (B) and (C) and the amount of comonomer employed depends on the desired density of the components. Higher alpha olefins need to be present in greater concentrations than lower alpha olefins to ensure the same density. A suitable alpha olefin to ethylene ratio range for 1-butene comonomer is from about 100 mol to about 500 mol comonomer per 1 kmol of ethylene.

The amount of comonomer used in the gas phase reactor if 1-butene is the comonomer may range from 50 to 150 mol, preferably 50 to 100 mol per kmol of ethylene. There is however no requirement that the comonomers used in high and low molecular weight components be the same.

Where a cascade slurry, gas phase reactor system is used the polymer is collected continuously or intermittently from the slurry (loop) reactor, hydrocarbons are removed from the polymer and the resultant polymer is introduced into the gas phase reactor. These procedures are well-known and would be carried out readily by the person skilled in the art.

The core layer may comprise any film grade polymer resin having the desired properties and processability. Thus, it may be a low density polyethylene (LDPE) resin produced in a high pressure process. Alternatively, it may be a linear low density polymer (LLDPE) resin produced by polymerising ethylene and alpha-olefin comonomers in the presence of a Ziegler, chromium or metallocene catalyst. Especially preferred materials in this respect are bimodal LLDPE resins, like those referred to in WO 99/64509 which have outstanding mechanical properties as well as excellent processability.

Alternatively, the core may comprise a polar copolymer resin of ethylene, such as a copolymer of ethylene and a vinyl alcohol or a copolymer of ethylene and an acrylate monomer. The core may also comprise a medium density polyethylene resin. Especially preferred resins of this class are the bimodal MDPE resins, such as those described in WO 99/41310. Moreover, the core layer may comprise a high density polyethylene resin of which preferred members are described in WO 99/51649 and are bimodal.

It is possible to use an adhesive layer between the core layer and the sealing layer to improve adhesion between these two layers. The adhesive layer may be a polymer having a good adhesion to the polymers of the sealing and core layers. Such adhesive polymers have been widely discussed in the art and may be ionomers, copolymers of ethylene and ethyl acrylate etc. If the layers are to be laminated, then glues may also be employed to improve adhesion.

As previously mentioned, the films of the invention may comprise additional layers over and above the sealing and core layers. The nature and number of these layers is determined by the use of the film although in normal applications additional layers would not be required. In such a case, the film surface would comprise, for example, an LDPE resin from the core layer. If a film is to be used in an environment where a barrier against oxygen would be desirable, it is preferred if the outside of the core layer is covered by a layer comprising ethylene/vinyl alcohol copolymer resins.

Methods of producing heat suitable films are well-known in the art. In one embodiment, the sealing layer, core layer and optional additional layers are coextruded to produce the suitable film structure. The coextruded film is then blown to a film.

In another embodiment, the layers are produced separately and are laminated together. It is of course possible to coextrude the sealing and core layer and then laminate on the optional additional layers or coextrude the core layer and optional additional layer and laminate with the sealing layer. All these various preparations are well-known to the skilled artisan.

The heat sealable films of the invention, comprising the sealing layer, core layer and optional further additional layers preferably have sealing windows of at least 20° C., more preferably at least 30° C. Moreover, heat sealing is preferably possible at temperature below 100° C. By sealing window is meant the range of temperature at which successful sealing of the films of the invention to the article to be sealed may be achieved.

The hot-tack force with the films of the invention is preferably at least 0.5 N/15 mm, more preferably at least 1 N/15 mm, especially 1.5 N/15 mm.

The invention will now be further described with reference to the following non-limiting examples and Figures in which.

Figure 3:
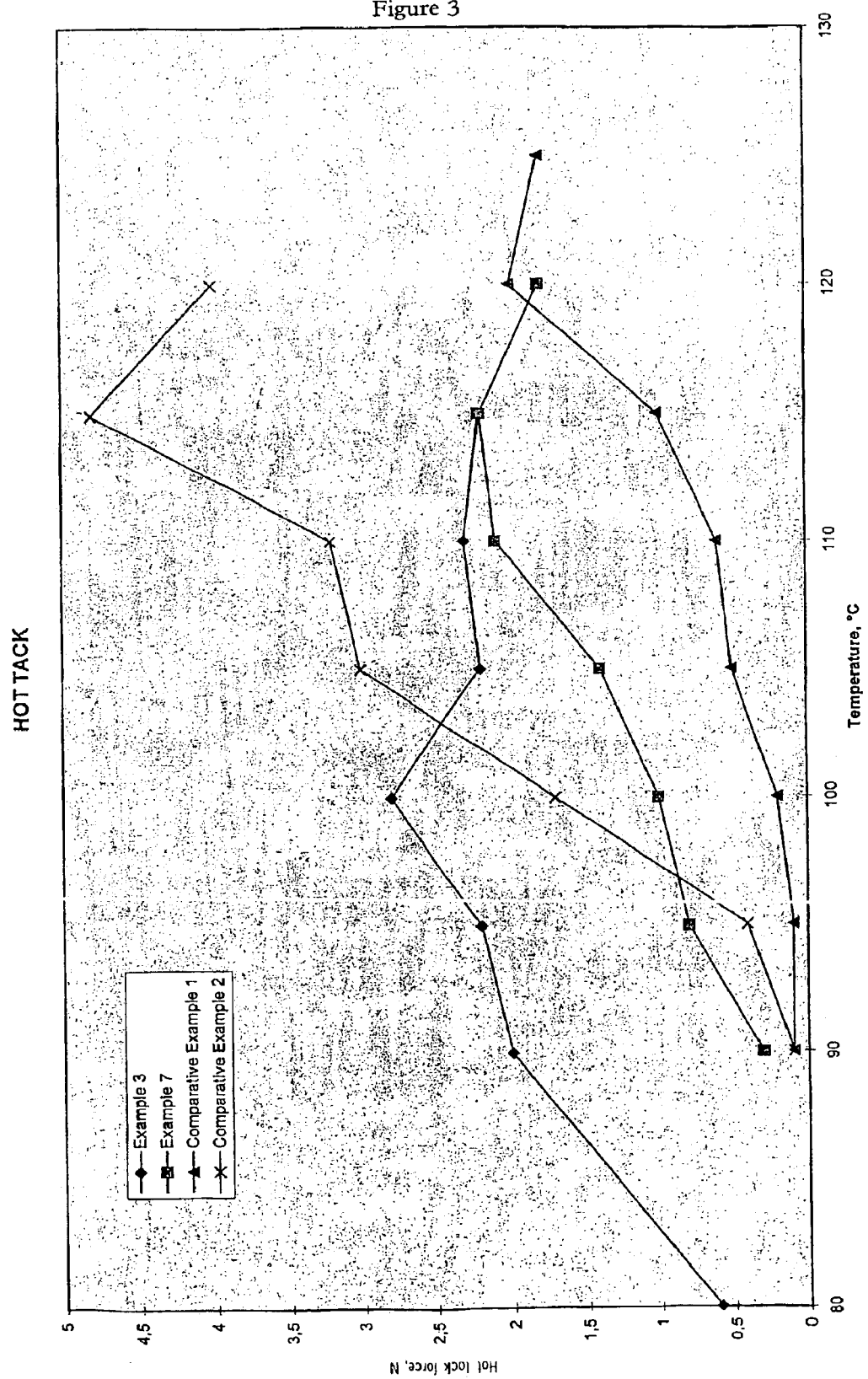

FIG. 3 shows the Hot tack properties of examples 3 and 7 and comparative examples 1 and 2.

Figure 4:
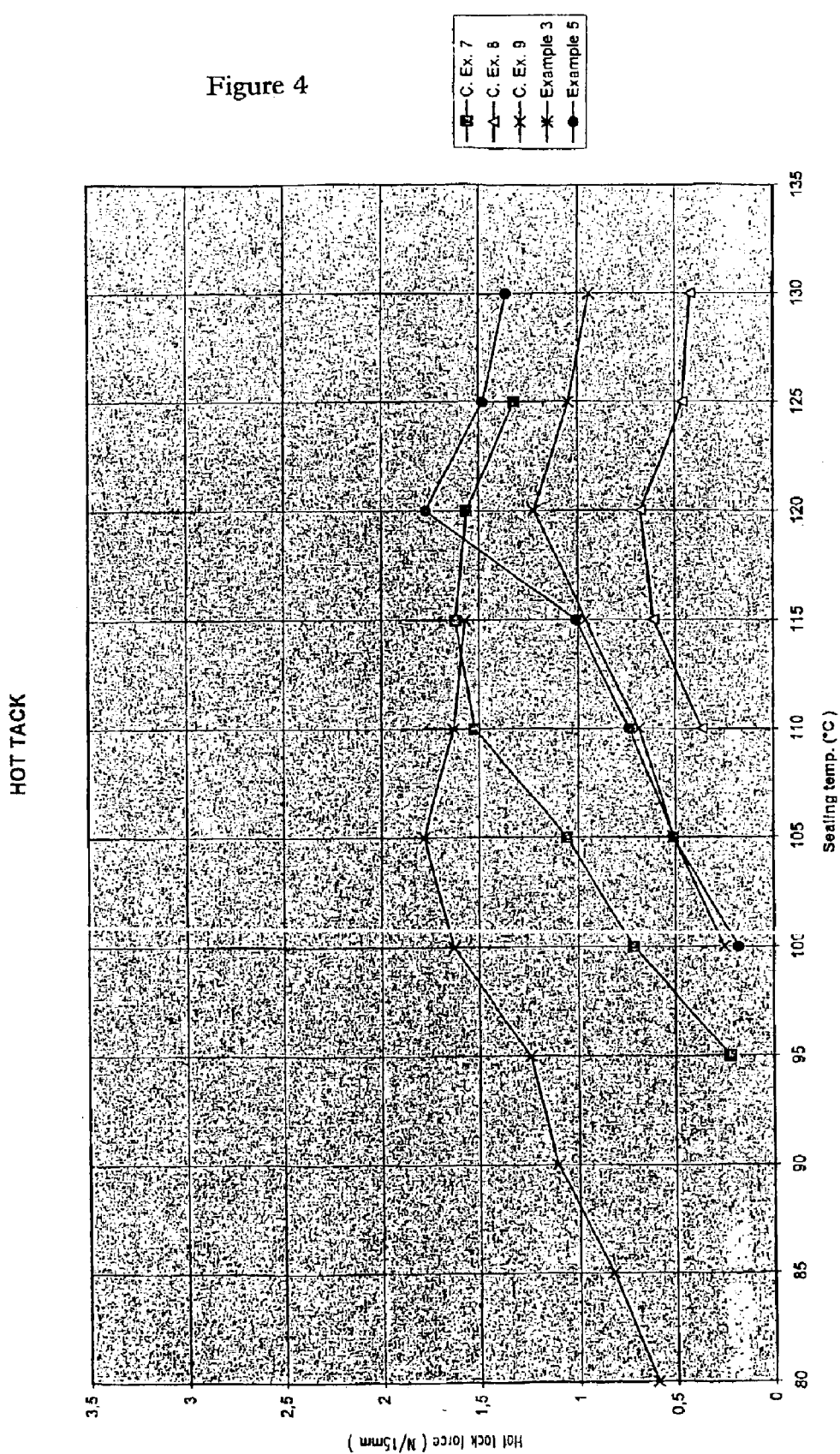

FIG. 4 shows the Hot tack properties of examples 3 and 5 and comparative examples 7 to 9.

EXAMPLE 1

134 g of a metallocene complex (TA02823 by Witco, n-butyl dicyclopentadienyl hafnium dichloride containing 0.36% by weight Hf) and 9.67 kg of a 30% MAO solution supplied by Albemarle were combined and 3.18 kg dry, purified toluene was added. The thus obtained complex solution was added on 17 kg silica carrier Sylopol 55 SJ by Grace. The complex was fed very slowly with uniform spraying during 2 hours. Temperature was kept below 30° C. The mixture was allowed to react for 3 h after complex addition at 30° C.

The thus obtained catalyst was dried under nitrogen for 6 h at 75° C. temperature. After nitrogen drying the catalyst was further dried under vacuum for 10 h.

This catalyst is referred to as catalyst B in the subsequent examples.

EXAMPLE 2

168 g of metallocene complex (bridged siloxy-substituted bis-indenyl zirconium dichloride, according to a patent application FI 960437) and 9.67 kg of a 30% MAO solution supplied by Albemarle were combined and 3.18 kg dry, purified toluene was added. The thus obtained complex solution was added on 9 kg silica carrier SP9–243 by Grace having average particle size of 20 microns, pore volume of 1.5–1.7 $mm^3$ and specific surface area of 350–400 $m^2/g$. The complex was fed very slowly with uniform spraying during 2 hours. Temperature was kept below 30° C. The mixture was allowed to react for 2 h after complex addition at 30° C.

The thus obtained catalyst was dried under nitrogen for 6 h at 75° C. temperature. After nitrogen drying the catalyst was further dried under vacuum for 10 h.

This catalyst is referred to as catalyst A in the subsequent examples.

EXAMPLE 3

Into a continuously operating loop reactor of 500 $dm^3$ volume was fed ethylene, propane diluent, 1-butene comonomer and hydrogen together with the catalyst prepared according to Example 1 so that a polymer having MFR and density according to Table 1 was formed at a rate of about 30 kg/h. The polymer slurry was continuously withdrawn from the reactor, the hydrocarbons were removed and the polymer containing the active catalyst was transferred into a gas phase reactor where the polymerization was continued by adding ethylene and 1-butene comonomer. The polymer was collected from the gas phase reactor at such a rate that the production split was as indicated in Table 1. The polymer was compounded together with additives. The MFR and density of the pelletized polymer is shown in Table 1.

EXAMPLES 4–7

The procedure of Example 3 was repeated, except that a catalyst prepared according to Example 2 was used and that the polymer properties were as indicated in Table 1.

TABLE 1

Polymerization data

| Sample | Ex 3 | Ex 4 | Ex 5 | Ex 6 | Ex 7 |
|---|---|---|---|---|---|
| Catalyst | B | B | A | A | A |
| Density [kg/m$^3$], (1$^{st}$ stage) | 937 | 934 | 934 | 931 | 929 |
| MFR$_2$ [g/10 min], (1$^{st}$ stage) | 93 | 86 | 82 | 260 | 150 |
| Density [kg/m$^3$] | 915 | 913 | 918 | 918 | 915 |
| MFR$_2$ [g/10 min] | 0.82 | 2.6 | 1.2 | 1.4 | 1.2 |
| Split [loop-%/gpr-%] | 42/58 | 42/58 | 52/48 | 48/52 | 48/52 |

EXAMPLE 8

Figure 1:
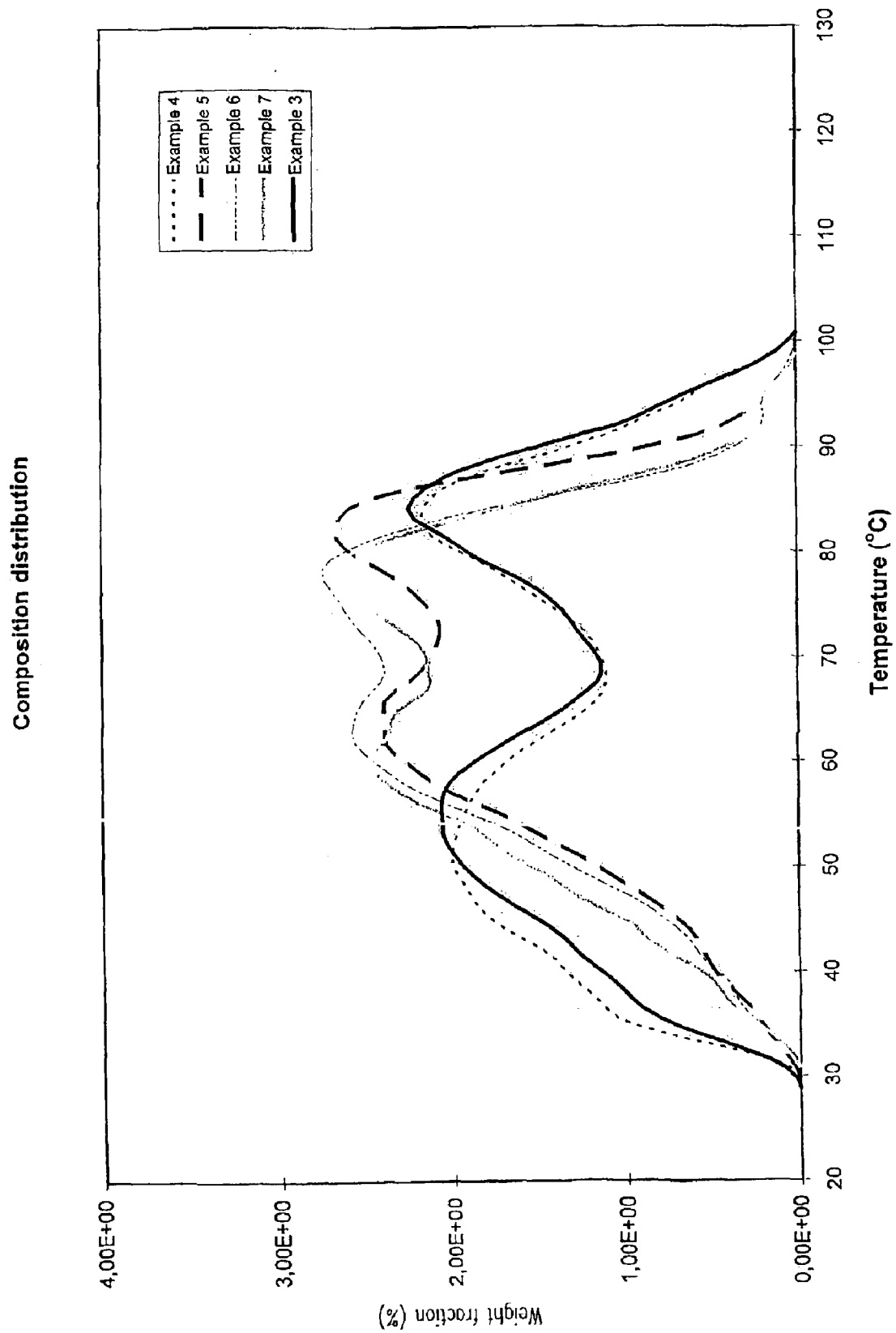
FIG. 1 is a TREF fractogram of the products of Examples 3 to 7.

The polymers produced in Examples 3–7 were then analyzed by using TREF. The data of the analysis is shown in Table 2. The fractograms are shown in FIG. 1.

COMPARATIVE EXAMPLES 1–6

Figure 2:
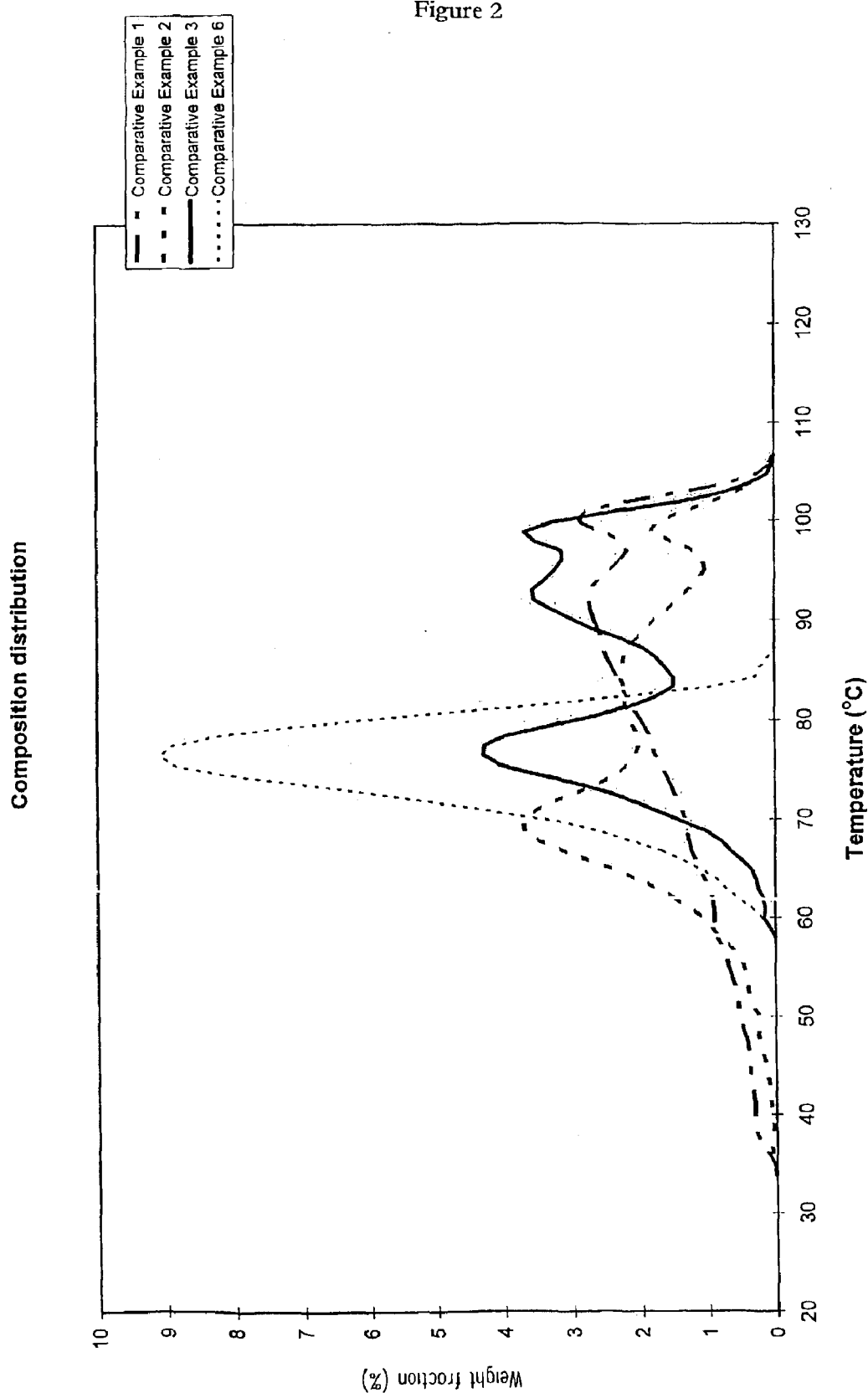
FIG. 2 is a TREF fractogram of the products of comparative examples 1, 2, 3 and 6.

Commercially available materials LE6520 (CE1, unimodal Ziegler based PE), Elite 5400 (CE2, metallocene based PE), Elite 5110 (CE3, metallocene based PE), Luflexen 0322HX (CE4, metallocene based PE), m18Pfax (CE5, metallocene based PE) and mPactD144 (CE6, metallocene based PE) were analyzed by TREF. The data is shown in Table 2. Fractograms are shown in FIG. 2.

TABLE 2

Analysis data

| Material | Ex 3 | Ex 4 | Ex 5 | Ex 6 | Ex 7 | CE1 | CE2 | CE3 | CE4 | CE5 | CE6 |
|---|---|---|---|---|---|---|---|---|---|---|---|
| Density [kg/m$^3$] | 915 | 913 | 918 | 918 | 915 | 919 | 917 | 926 | 903 | 920 | 922 |
| MFR$_2$ [g/10 min] | 0.82 | 2.6 | 1.2 | 1.4 | 1.2 | 1.1 | 0.95 | 0.85 | 1.4 | 0.96 | 0.82 |
| TREF < 50° C. [%] | 22 | 26 | 10 | 10 | 12 | 7 | 1 | 0 | 21 | 0 | 0 |
| TREF > 75° C. [%] | 37 | 31 | 38 | 32 | 31 | 65 | 51 | 82 | 8 | 80 | 99 |
| TREF > 80° C. [%] | 28 | 23 | 26 | 18 | 18 | 52 | 41 | 62 | 3 | 64.5 | 92 |
| TREF > 90° C. [%] | 7 | 6 | 4 | 2 | 2 | 26 | 18 | 42 | 0 | 21 | 28.5 |
| TREF > 100° C. [%] | 0 | 0 | 0 | 0 | 0 | 1 | 3 | 5 | 0 | 1 | 0 |
| TREF: No. of peaks | 2 | 2 | 2 | 2 | 2 | 2 | 3 | 3 | 1 | 1 | 1 |

EXAMPLE 9

The polymers prepared in Examples 3–7 were blown into a film on a Windmöbller & Hölscher blown film line. A 60 mm extruder with length to diameter (L/D) ratio of 30 was used. The die diameter was 200 mm and the die gap was 2.3 mm. Blow-up ratio (BUR) was 2.5 and the frost line height (FLH) was 450 mm. The output was 60 kg/h. A dual lip 'Unifow' cooling ring was used. Data is shown in Table 3.

TABLE 3

Blown film and sealing data

| Material | Ex 3 | Ex 4 | Ex 5 | Ex 6 | Ex 7 | CE1 | CE2 |
|---|---|---|---|---|---|---|---|
| Melt temp., ° C. | 254 | 263 | | | | | |
| TS MD, MPa | 41 | 39 | | | 21 | | |
| TS TD, Mpa | 41 | 46 | | | 26 | | |
| Tear MD, N | 2.7 | 2.5 | | | 3.0 | | |
| Dart drop, g | 816 | 858 | 190 | 210 | 223 | 126 | 1117 |
| Haze | 16 | 13 | 10 | 11 | 9 | 10 | 10 |
| Gloss | 77 | 91 | 84 | 90 | 96 | 105 | 96 |

EXAMPLE 10

The films prepared in Example 8 were put to a hot tack test to measure the sealability. Two film samples were pressed together at elevated temperature. The sealing time was 0.5 seconds, the lag time was 0.1 seconds and the sealing pressure was 90 N for a specimen width 15 mm. The film thickness was 40 μm. The force required to break the seal was then measured. The data is shown in FIG. 3.

Comparison of hot tack data and TREF fractograms reveals that when a sufficient amount of material elutes at a temperature of below 50° C., a hot tack curve with a wide temperature window extending to low temperature is obtained. Especially this is true for material prepared in Example 3.

EXAMPLE 11

The materials of Example 3 and Example 5 were coextruded to a three-layer film on a Reifenhäuser blown film line. The core layer and the inner layer consisted of a bimodal linear low density ethylene polymer manufactured and sold by Borealis under a trade name of LE6592. The material of Example 3 was used for the sealing layer. The sealing, core and inner layer had a thickness of 14, 13 and 13 microns, respectively.

Die diameter was 200 mm, die gap was 1.0 mm and BUR was 2.5.

Also 4 other materials were tested as outer layers, these were Dow Affinity PL1881 (metallocene material), Dowlex NC5056E, LE0601 (LD for lamination) and LE6504 (LLD for lamination). Data is shown in Table 4.

TABLE 4

Coextruded film data

| Outer layer | Dart- | Gloss | Haze |
|---|---|---|---|
| Dowlex NC5056E | 320 | 86 | 51 |
| Dowlex PL1881 | 208 | 90 | 52 |
| LE0601 (LDPE) | 164 | 71 | 56 |
| LE6504 (but. | 178 | 85 | 54 |

TABLE 4-continued

Coextruded film data

| Outer layer | Dart- | Gloss | Haze |
|---|---|---|---|
| Ex 3 | 187 | 47 | 56 |
| Ex 5 | 183 | 40 | 56 |

What is claimed is:

1. A process for the preparation of a heat sealable film comprising a core layer and a sealing layer, said process comprising attaching said core layer to said sealing layer, said sealing layer comprising an ethylene copolymer composition on which
    (1) there are two distinct maxima in the TREF fractogram of the ethylene copolymer composition;
    (2) at least 10% of the ethylene copolymer composition elutes in TREF at a temperature of less than 50° C.;
    (3) at least 25% of the ethylene copolymer composition elutes in TREF at a temperature of higher than 75° C.;
    (4) none of the ethylene copolymer composition elutes in TREF at a temperature of higher than 100° C.;
    (5) the ethylene copolymer composition comprises two components, one of which is of relatively high comonomer content and high molecular weight, the other of which is of relatively low comonomer content and low molecular weight, both components being prepared by polymerization of ethylene with a $C_{3-20}$ alpha-olefin in the presence of a single site catalyst;
    (6) the ethylene copolymer composition has a density of between 905 and 930 kg/m$^3$, and an $MFR_2$ between 0.3 and 4.0 g/10 min.

2. A process as claimed in claim 1 wherein at least 20% of the ethylene copolymer composition elutes in TREF at a temperature of less than 50° C.

3. A process as claimed in claim 1 wherein at least 30% of the ethylene copolymer composition elutes in TREF at a temperature of higher than 75° C.

4. A process as claimed in claim 1 wherein the ethylene copolymer composition has a density of 905 to 920 kg/m$^3$.

5. A process as claimed in claim 1 wherein the low molecular weight component has a density of 925 to 940 kg/m$^3$ and a comonomer content of 1.0 to 3.5%/mol.

6. A process as claimed in claim 1 wherein the high molecular weight component has a density of 860 to 910 kg/m$^3$ and a comonomer content of 5 to 8%/mol.

7. A process as claimed in claim 1 wherein said $C_{3-20}$ alpha-olefin is propene or 1-butene.

8. A process as claimed in claim 1 wherein said single site catalyst is bis(n-butylcyclopentadienyl) hafnium dihalide or a siloxy-substituted bridged bisindenyl zirconium dihalide.

9. A process as claimed in claim 1 wherein the weight ratio of low molecular weight component to high molecular weight component is between 30/70 to 60/40.

10. A process as claimed in claim 1 wherein the core layer comprises LDPE, LLDPE, MDPE, HDPE or an ethylene vinyl alcohol/acrylate copolymer.

11. A process as claimed in claim 1 wherein said core layer and said sealing layer are laminated.

12. A process as claimed in claim 1 wherein said core layer and said sealing layer are coextruded.

13. A process as claimed in claim 1 wherein said heat sealable film has a sealing window of 20° C.

14. A process as claimed in claim 1 wherein said heat sealable film may be sealed at less than 100° C.

15. A heat sealable film obtainable by a process as claimed in claim 1.

16. A heat sealable film comprising a core layer and a sealing layer said sealing layer comprising an ethylene copolymer composition in which
    (1) there are two distinct maxima in the TREF fractogram of the ethylene copolymer composition;
    (2) at least 10%, of the ethylene copolymer composition elutes in TREF at a temperature of less than 50° C.;
    (3) at least 25%, of the ethylene copolymer composition elutes in TREF at a temperature of higher than 75° C.;
    (4) none of the ethylene copolymer composition elutes in TREF at a temperature of higher than 100° C.;
    (5) the ethylene copolymer composition comprises two components, one of which is of relatively high comonomer content and high molecular weight, the other of which is of relatively low comonomer content and low molecular weight, both components being prepared by polymerization of ethylene with a $C_{3-20}$ alpha-olefin in the presence of a single site catalyst;
    (6) the ethylene copolymer composition has a density of between 905 and 930 kg/m$^3$, and an $MFR_2$ between 0.3 and 4.0 g/10 min.

\* \* \* \* \*